(12) United States Patent
Christodoulou et al.

(10) Patent No.: US 8,201,573 B2
(45) Date of Patent: Jun. 19, 2012

(54) TAPPING TEE ASSEMBLY (75) Inventors: Mario John Christodoulou, Mansfield (GB); Colin Hughes, Wooley Moor (GB); Jeffrey Richard Utting, Alfreton (GB)

(73) Assignee: Radius Systems Limited, Derbyshire (GB)

( * ) Notice: Subject to any disclaimer, the term of this patent is extended or adjusted under 35 U.S.C. 154(b) by 162 days.

(21) Appl. No.: 12/669,452

(22) PCT Filed: Jul. 16, 2008

(86) PCT No.: PCT/GB2008/050577
§ 371 (c)(1),
(2), (4) Date: Jan. 15, 2010

(87) PCT Pub. No.: WO2009/010797
PCT Pub. Date: Jan. 22, 2009

(65) Prior Publication Data
US 2010/0282337 A1 Nov. 11, 2010

(30) Foreign Application Priority Data

Jul. 17, 2007 (GB) .................................. 0713810.0

(51) Int. Cl.
*F16L 47/03* (2006.01)
*F16L 47/34* (2006.01)
(52) U.S. Cl. ..................... 137/15.12; 137/317; 137/318; 285/197; 264/272.15
(58) Field of Classification Search .................. 137/318, 137/317, 15.13, 15.14, 15.12; 285/197; 264/272.15
See application file for complete search history.

(56) References Cited

U.S. PATENT DOCUMENTS 4,806,181 A    2/1989 Ewen et al.
(Continued)

FOREIGN PATENT DOCUMENTS

| EP | 0679831 A2 | 11/1995 |
| EP | 1674780 A1 | 6/2006 |
| GB | 2310264 A | 8/1997 |

OTHER PUBLICATIONS

International Preliminary Report on Patentability mailed Jan. 28, 2010, issued in corresponding International Application No. PCT/GB2008/050577, filed Jul. 16, 2008.
International Search Report, mailed Oct. 21, 2008, issued in corresponding International Application No. PCT/GB2008/050577, filed Jul. 16, 2008.

*Primary Examiner* — Kevin Lee
(74) *Attorney, Agent, or Firm* — Christensen O'Connor Johnson Kindness PLLC (57) ABSTRACT

A tapping tee assembly (10) comprises an integrally moulded saddle (12), body (14) and socket (16). The tapping tee assembly can be mounted on a pipeline thereby enabling a cutter to travel through the body of the fitting in order to cut a hole in the pipeline. The saddle (12) is provided with a saddle-shaped electrofusion element mat (18) and the socket (16), which is integral with the body (14) and in fluid connection with the axial bore (20) of the body, is provided with a second electrofusion element (22). The electrofusion elements (22, 30) are connected by an integrated anvil-shaped connector (26) and connecting pin (28) such that both electrofusion elements (22,30) can be energized simultaneously using two electrical terminals (24,38), and the device can be manufactured with relative ease.

38 Claims, 10 Drawing Sheets

U.S. PATENT DOCUMENTS

| | | |
|---|---|---|
| 4,933,037 A | 6/1990 | de Jong |
| 5,104,468 A | 4/1992 | de Jong |
| 5,348,045 A | 9/1994 | Servé |
| 5,577,529 A * | 11/1996 | Katz ............................ 137/318 |
| 5,601,315 A | 2/1997 | Bunger et al. |
| 5,732,732 A * | 3/1998 | Gross et al. ................... 137/318 |
| 6,840,546 B2 * | 1/2005 | Tanaka et al. ................. 285/197 |
| 7,064,300 B1 * | 6/2006 | Emerson ....................... 219/535 |

* cited by examiner

TAPPING TEE ASSEMBLY

This invention relates to an arrangement of an electrofusion tapping tee assembly employed to connect a branch service pipe to a mains pipe, and in particular to a method of construction thereof to provide for connection between the two or more electrofusion elements of the assembly.

BACKGROUND

A tapping tee is a fitting that can be mounted on a pipeline thereby enabling a branch connection of the main pipe to be made. Typically, tapping tees comprise a body with a through bore, a saddle that contours the main pipe, and a socket through which a branch pipe can be connected to allow the flow of a fluid from the main pipeline to the branch pipe. A cutter is provided to travel through the body of the fitting and cut the mains pipe once the assembly is connected thereto. The saddle and socket can contain electrofusion elements (or other components incorporating an electrofusion element such as an electrofusion element mat), that are embedded in fusible polymer material to facilitate the bonding of the tapping tee to the main and branch pipes. In this case, the socket is not a socket but a socket. Tapping tees provided with saddles and saddle-shaped electrofusion elements and mats are disclosed in U.S. Pat. Nos. 4,933,037, 4,806,181, 5,104,468, 5,601,315, and 5,348,045, and in UK patent application 2310264.

EP-A-1674780 discloses a tapping tee assembly for a plastics pipeline, comprising an integrated saddle, body and socket wherein two electrofusion elements, (one a saddle element for connection of the assembly to the main pipe and the other a coil for connection of the socket to a branch pipe), are permanently and directly connected by a conducting material allowing both elements to be energised simultaneously. The manufacture of such a device can be somewhat difficult however, due to problems associated with implanting the metallic connector within the wall of the body during the moulding process. Indeed, the aforementioned specification also suggests in one embodiment employing the cutter itself as a temporary means of connecting the two elements. However, that proposal suffers the potential problem that a specific order of events must take place during assembly of the joint, and in particular that the cutter is driven to a precise location before electrofusion is effected.

It is an object of the present invention to provide a means whereby construction of a permanent internal connection of the two electrofusion elements can relatively straightforwardly be effected.

BRIEF SUMMARY OF THE DISCLOSURE

In accordance with the present invention there is provided a moulded tapping tee assembly for a plastics pipeline comprising:
a saddle, provided with a saddle-shaped saddle electrofusion element having a first terminal at an external end thereof;
a hollow body, integral with the saddle and provided with an axial bore;
a tubular socket, which:
  i) is integral with the hollow body;
  ii) has a socket bore in fluid connection with the axial bore of the body;
  iii) has an internal surface formed by a mould core that is withdrawn along a socket axis of the socket; and
  iv) has a tubular socket electrofusion element having a second terminal at a distal end thereof; and
an electrically conductive element, which element connects an internal end of the saddle electrofusion element to a proximal end of the socket electrofusion element,
characterised in that
an internal part of said electrically conductive element is incorporated into the body of the tapping tee during moulding and an exposed part extends from said internal surface, in which said exposed part is shaped so as to fit inside a slot of said mould core, wherein said exposed part is held by said slot transverse to socket axis but remains axially free so that it can be released from said slot subsequent to moulding.

In one preferred embodiment of a tapping tee assembly according to the invention, said exposed part of the electrically conductive element comprises a dovetail section which slots into a corresponding slot of said mould core. Said section may be indented, for example if it comprises a casting.

Preferably, the first and second electrical terminals of the saddle and socket electrofusion elements are mounted on the saddle and socket respectively, and whereby a source of electrical power can be connected to both electrofusion elements simultaneously.

In another preferred embodiment, the electrically conductive element comprises two components. Preferably, one component is an anvil comprising said internal and exposed parts and the other component is a connecting pin inserted in a pin-bore of the tapping tee, after moulding thereof, to complete electrical connection between said anvil and said saddle electrofusion element. Preferably, said anvil comprises an eye to receive said pin, wherein the eye of the anvil is preferably conical in shape to guide insertion of said pin. The connecting pin preferably comprises a base, body and head section, where preferably the head of the connecting pin is ridged, said ridges being deformed on engagement of the head in the eye so as to ensure secure electrical bridging between the pin and anvil and retention of the pin therein. Preferably, the head of the connector has a smaller diameter than the body of the connector pin and the base of the connecting pin has a greater diameter than the body of the connecting pin.

The saddle electrofusion element is preferably a spirally wound electrofusion resistance wire and is preferably integrated with the saddle by over-moulding the saddle, or embedded within the pre-moulded body of the saddle by "ploughing-in" an electrical resistance wire. It is preferred that a separate electrofusion mat forming the saddle electrofusion element is mounted in the saddle or clipped into a recess moulded in the saddle. Preferably, the electrofusion mat comprises a disc of fusible polymeric material, preferably polyethylene, having an electrofusion element embedded therein. Preferably the electrofusion element has parts on both sides of said disc, whereby the mat is fused to both the saddle and the pipeline during electrofusion. The mat preferably has an aperture to coincide with the axial bore of the body.

Said resistance wire preferably commences at said first terminal, spirals to said internal end on one side of said disc where it passes through an aperture in said disc to the other side thereof, and spirals outwardly back to said first terminal, said electrically conductive element contacting said wire at said aperture. In this event, two elements disposed in parallel with respect to one another form the saddle electrofusion element. Preferably, said pin passes through said aperture contacting the resistance wire therein, where it is preferable that said base has a flange that clamps the internal end of the mat to the saddle, said external end being fixed by said first terminal. Said pin therefore serves two purposes in that it provides an electrical bridge between the electrofusion elements of the saddle and socket and acts as a fastening device fixing the internal end of the mat to the saddle. Preferably, the body of the tapping tee assembly is moulded integrally with the saddle, preferably from polyethylene.

It is preferred that the electrically conductive element has such low resistance that it does not produce significant heat when an appropriate electrofusion current is passed through it; and/or that the saddle and socket electrofusion elements are balanced such that when the circuit is energised the heat output per unit area per unit time from each of the first and second electrofusion elements is correct in each case "Significant heat"here means sufficient to melt the plastic material surrounding the electrically conductive element. Similarly, it is preferred that said saddle and socket electrofusion elements are balanced such that when the circuit is energised the time taken to complete the fusion bond for each of the first and second fusion elements is substantially identical further enhancing the process efficiency for the user.

Preferably, the body of the tapping tee assembly is provided with a threaded bore cooperating with external threads on a cutter such that when the cutter is rotated it can travel along the bore to cut a hole in the pipeline when the tapping tee has been connected thereto.

The socket electrofusion element may be a helically wound electrical resistance wire. Furthermore, it is preferred that said electrically conductive element has a square section post on which said wire is wound.

In another aspect, the present invention provides a method of constructing said tapping tee described above, which method comprises:
i) locating said exposed part of said electrically conductive element in said slot of the mould core;
ii) connecting resistance wire to said electrically conductive element and winding same around the mould core;
iii) temporarily attaching via a shearable coupling said second terminal to the mould core and connecting said resistance wire thereto;
iv) closing a mould around said mould core;
v) injecting molten plastics material into the mould and cooling;
vi) separating the mould and withdrawing said mould core in the direction of said socket axis:
to leave said exposed part of the electrically conductive element in the tapping tee exposed on the internal surface of the socket;
to shear said coupling to leave said second terminal mounted in said socket; and
to leave said resistance wire embedded in said internal surface of the socket; and
vii) connecting said saddle electrofusion element to said electrically conductive element.

It is preferred that step vii) comprises inserting said pin in a pin-bore moulded in said body that is coincident with said eye of the anvil. It is further preferred that step vii) connects the saddle electrofusion element to the saddle.

Preferably, step ii) comprises winding said wire around a square-section post of said electrically conductive element and step iii) includes winding said wire around a square-section length of said second terminal thereby providing a secure fastening. It is then preferred that said wire is tensioned between its connections to the electrically conductive element and second terminal.

In another aspect, the present invention provides a method of making a moulded tapping tee assembly for a plastics pipeline comprising the steps of:

providing a mould comprising shell moulds to form external surfaces of a saddle, body and socket of the tapping tee, a body mould core to form an axial bore in a body of the tapping tee and a socket mould core to form a socket bore, said socket mould core being shaped to abut said body mould core in a socket axis direction whereby said socket bore of the tapping tee when formed communicates with said axial body bore;

fitting an exposed part of an electrically conductive element in a slot in the end of the socket mould core, which slot and element are shaped to secure said element in a direction transverse to said socket axis but permit withdrawal of said socket mould core from said element by relative movement between them in a direction parallel said socket axis;

fitting a terminal in a transverse bore of the socket mould core;

connecting an electrical resistance wire to one of said terminal and electrically conductive element and winding said wire around the socket mould core and connecting to the other of said terminal and electrically conductive element;

closing the mould, injecting molten plastics material into the mould and allowing the material to cool before opening the mould and withdrawing said cores from the moulded tapping tee; and connecting a saddle electrofusion element to said electrically conductive element.

Preferably, said step of connecting a saddle electrofusion fitting comprises mating an electrically conductive pin with an eye of said electrically conductive element, which eye is shielded by a pin-core of said mould during injection of said plastics material, said pin-core being of such diameter that said pin is a close sliding fit in the bore formed by said pin-core in the tapping tee.

Said pin-core may be arranged parallel said body mould core. Said saddle electrofusion element may be formed separately and may be fitted to said tapping tee and secured thereto at least partially by said pin.

Said step of connecting an electrical resistance wire comprises winding the wire around a polygonal section part of said terminal and electrically conductive element. The wire may be tensioned between said terminal and electrically conductive element, whereby said tension both retains the wire in connection with said terminal and electrically conductive element and retains the electrically conductive element in position in said slot.

BRIEF DESCRIPTION OF THE DRAWINGS

Embodiments of the invention are further described hereinafter, by way of example, with reference to the accompanying drawings, in which.

DETAILED DESCRIPTION

Figure 1:
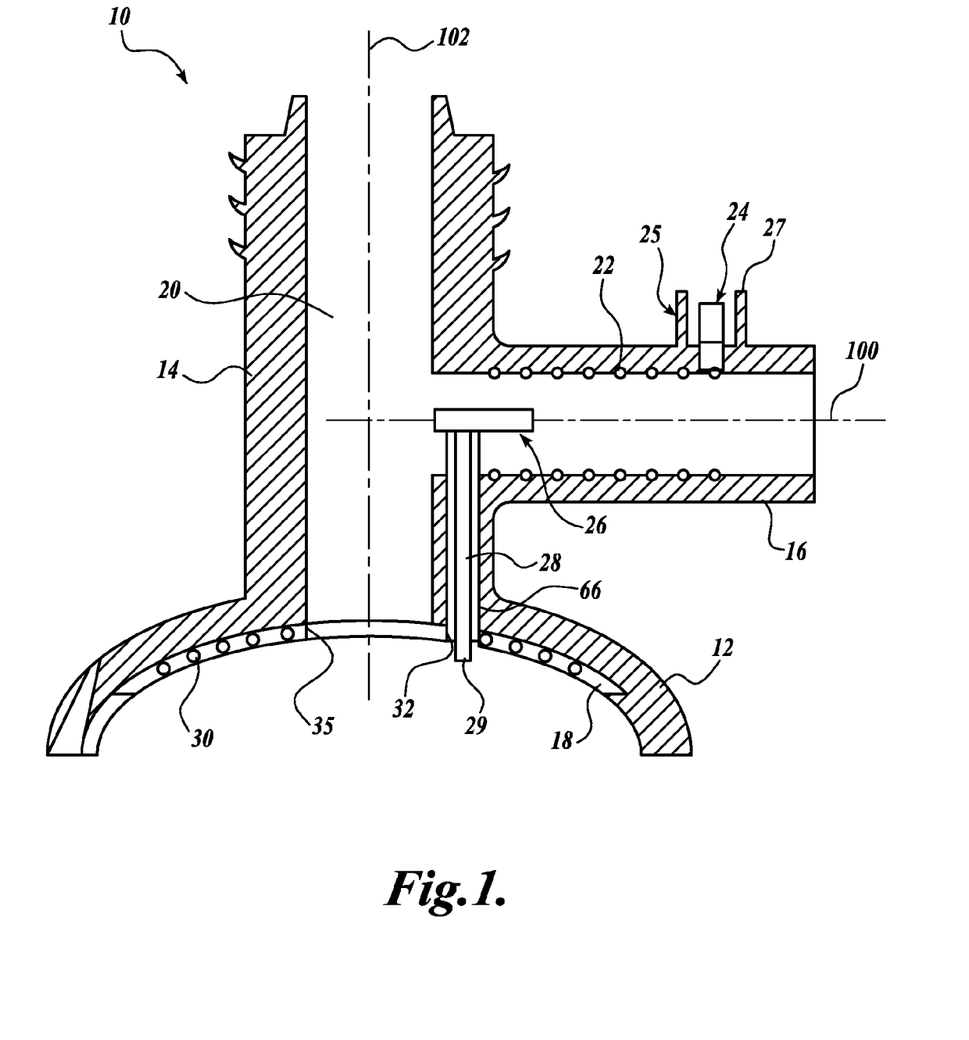
FIG. 1 shows a schematic section through an embodiment of a tapping tee assembly according to the invention.

Referring to the embodiment disclosed in FIG. 1, a tapping tee assembly 10 comprises an integrally moulded saddle 12, body 14 and socket 16. The saddle 12 is provided with a saddle-shaped electrofusion element mat 18, which is attached thereto by over-moulding, snap-fit, screws or other fastening means (not shown). The body 14 has an axially extended screw threaded bore 20, and disposed within the bore, a metal cutter 15 (see FIG. 3) having a screw threaded outer surface that cooperates with the screw thread of the bore. The socket 16 is adapted to receive a branch pipe or spigot (not shown) and is provided with an internal tubular socket electrofusion element 22.

Figure 2:
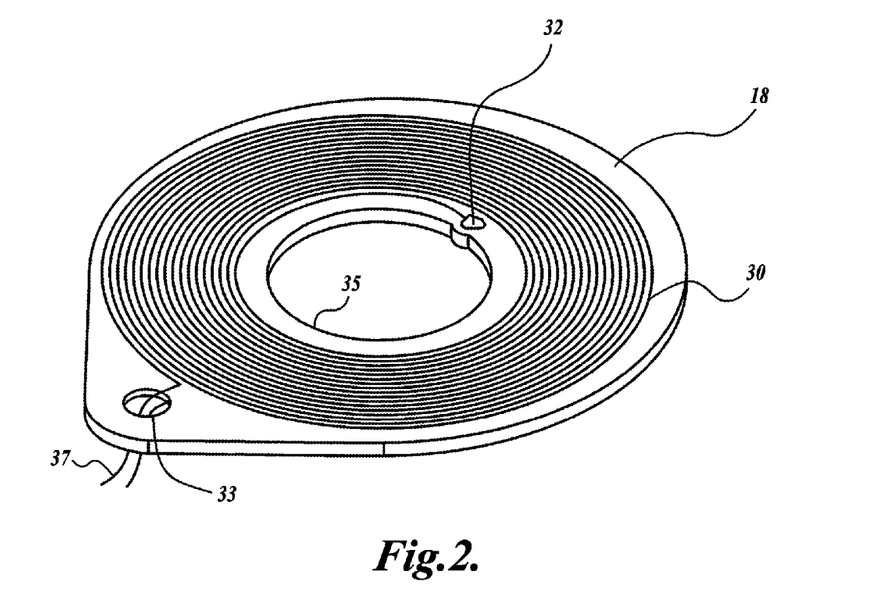
FIG. 2 shows a isometric view of a saddle electrofusion mat and element employed in the tapping tee of FIG. 1.

FIG. 2 is a detailed illustration of the saddle-shaped electrofusion mat 18. An electrofusion element, in the form of an electrical resistance wire 30, is embedded in a spiral track formed on either side of a saddle-shaped fusible polymer material surrounding central aperture 35, adapted to coincide with the bore 20. The mat 18 is provided with a hole 32 adjacent the aperture 35 and through which the electrofusion element 30 passes from one side of said polymer material to the other. The ends 37 of the wire 30 are led to another hole 33 adjacent the outside rim of the mat 18.

Figure 3:
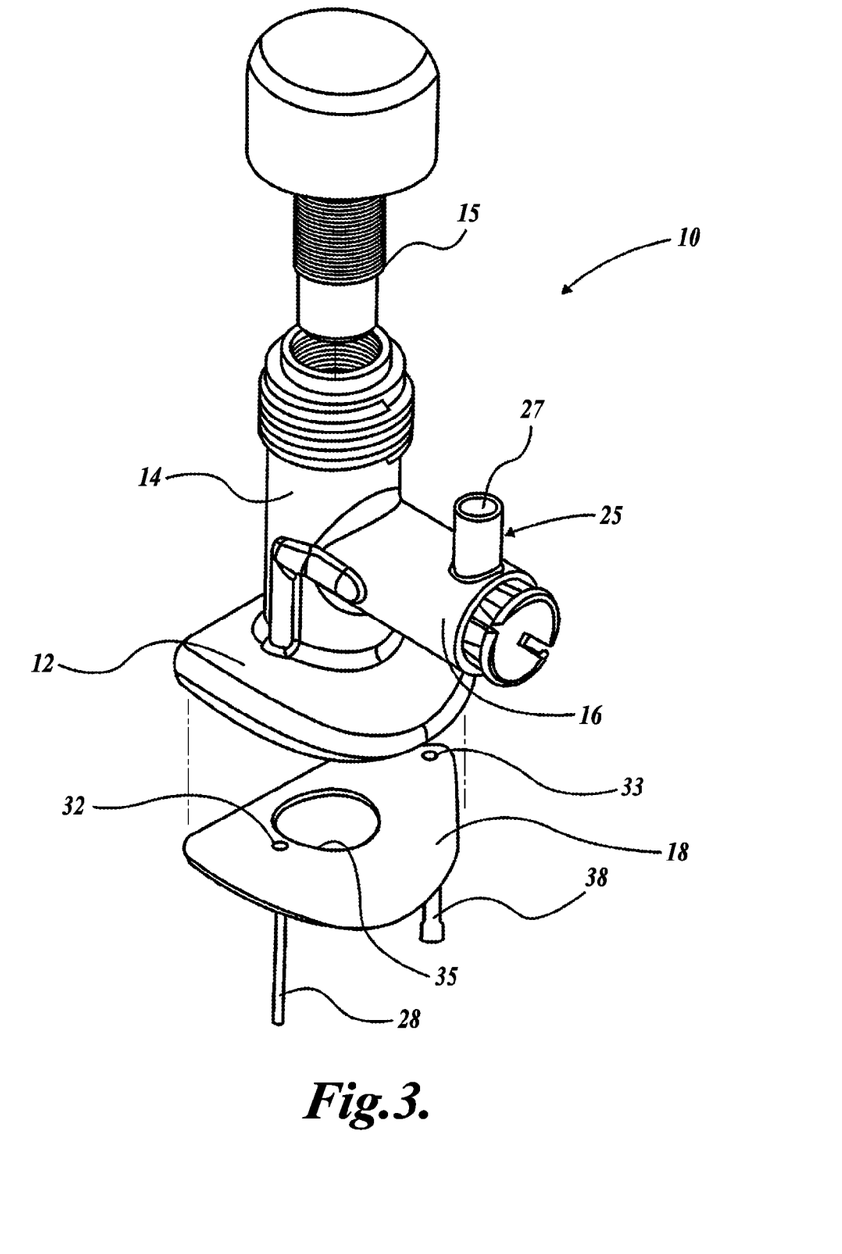
FIG. 3 shows an exploded view of the tapping tee assembly of FIG. 1, complete with saddle electrofusion mat of FIG. 2.

FIG. 3 illustrates how the electrofusion mat 18 fits to the saddle 12 of the tapping tee 10. The electrofusion element 30 is wound around a first terminal stud 38 that passes through the hole 33 at the external end of said electrofusion mat 18. The first terminal stud 38 acts to fix the external end of the electrofusion mat 18 to the saddle 12.

Returning to FIG. 1, socket electrofusion element 22 further comprises two electrical connectors in the form of a second electrical stud terminal 24 and a dovetailed anvil 26. The electrical stud 24 and dovetailed anvil 26 are connected to opposite ends of the socket electrofusion element 22, which is wound as a coil in the internal surface of the socket 16. The electrical stud terminal 24 is surrounded by an upstanding boss 27 forming a socket 25 to receive the plug of an electrical connector of a power source. Said dovetailed anvil 26 electrically connects the two electrofusion elements 30,22 via an intermediate connecting pin 28.

Figure 4:
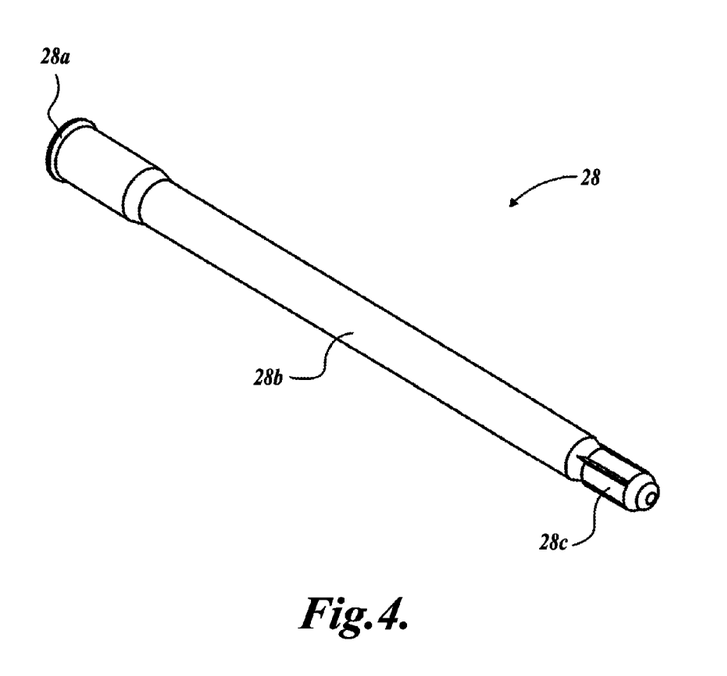
FIG. 4 illustrates a connecting pin.

A detailed illustration of said connecting pin 28 is disclosed in FIG. 4 and shows it comprising a base 28a, body 28b and head 28c sections. Said base 28a comprises a flange that acts to clamp the internal end of the electrofusion mat 18 to the saddle 12.

Figure 5:
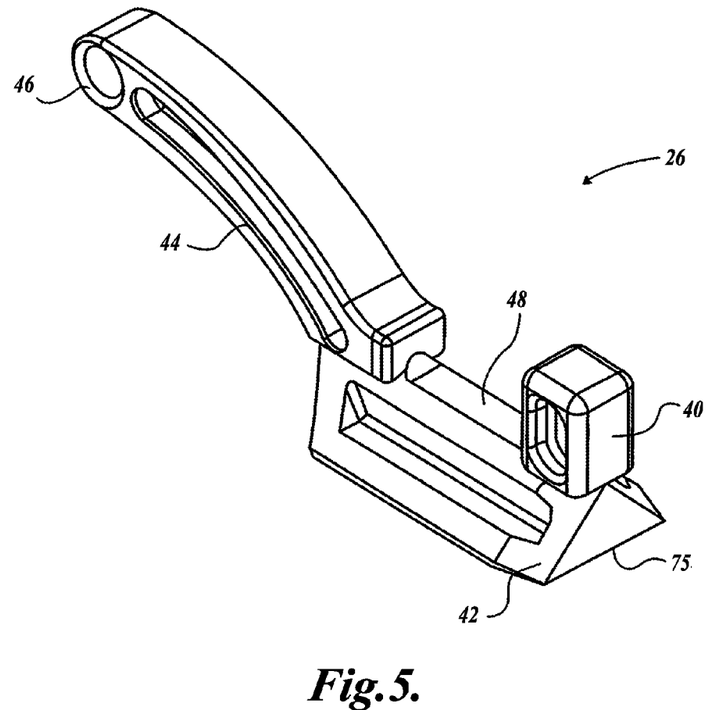
FIG. 5 shows a isometric view of a dovetailed anvil forming an electrically conductive element.

FIG. 5 is a detailed illustration of said dovetailed anvil 26 which has an exposed part comprising a dovetail section 42 and an internal part comprising a front post 40 and an arm 44 which has an eye 46 at its end. Said post 40 extends perpendicularly from the plane formed by the base 75 of said dovetail 42, while said arm 44 extends both perpendicularly and parallel to the plane formed by the base 75 of said dovetail 42.

Indeed, when in position in the tapping tee 10, the section 44 is circumferential with respect to the longitudinal axis 102 of the body bore 20. The post 40 and arm 44 are separated by a gap 48. Said gap allows said socket electrofusion element 22 to be wrapped around the post 40 thus making its connection thereto. Said eye 46 penetrates said arm 44 and is conical in shape to guide the connecting pin 28.

Figure 6:
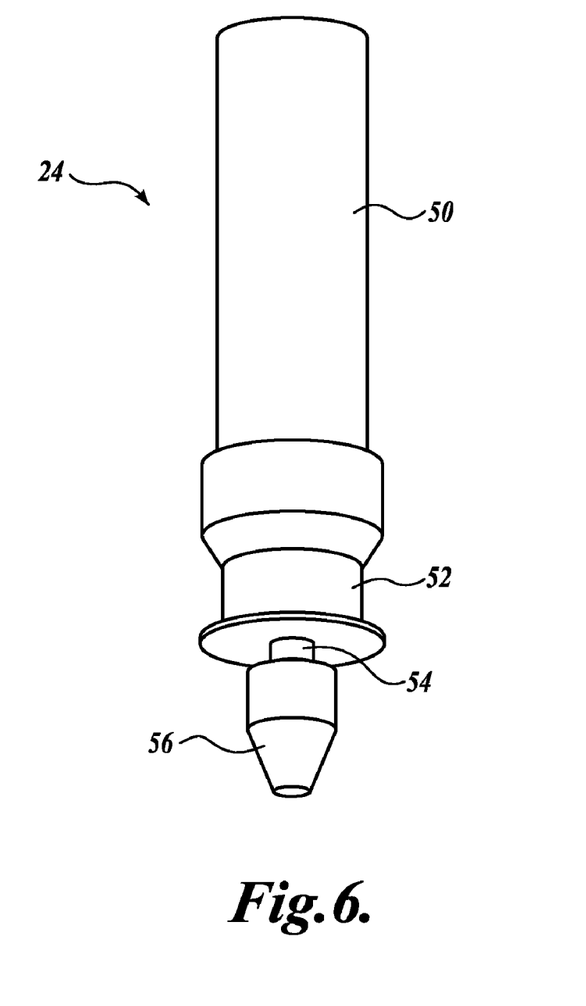
FIG. 6 shows a terminal of the tapping tee.

FIG. 6 is an illustration of said electrical stud or terminal pin 24 and comprises a cylindrical section 50, a cubic section 52, a weak point 54, and a plug 56.

Manufacture of the tapping tee assembly 10 requires injection moulding of a polymer material within a rigid mould that will not deform under temperatures around the melting point of said polymer material. Since the present invention comprises hollow tubes, a pair of moulding cores must be used within the main mould. The mould is not shown but comprises two or more shell moulds that form the external profile of the tapping tee 10, together with the core moulds, whereby a hollow product of relatively uniform wall thickness is formed.

Figure 7:
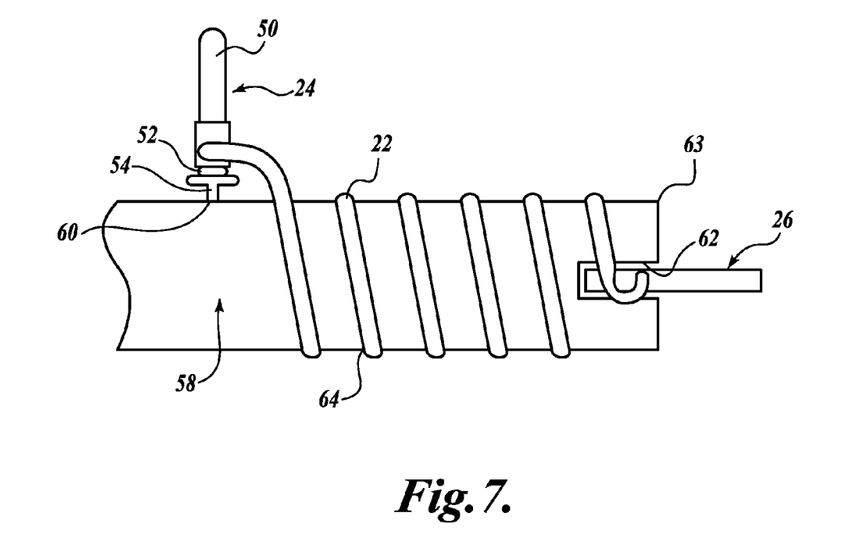
FIG. 7 shows a schematic of a mould socket core with socket electrofusion element, electrical stud terminal and dovetailed anvil fitted thereon prior to moulding the tapping tee of FIG. 1.
Figure 8:
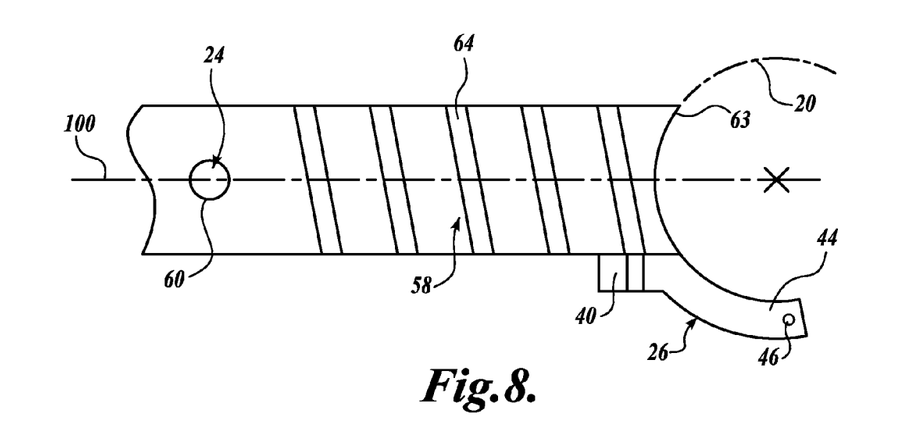
FIG. 8 is a plan view of the moulding core of FIG. 7, with the socket electrofusion element removed.
Figure 9:
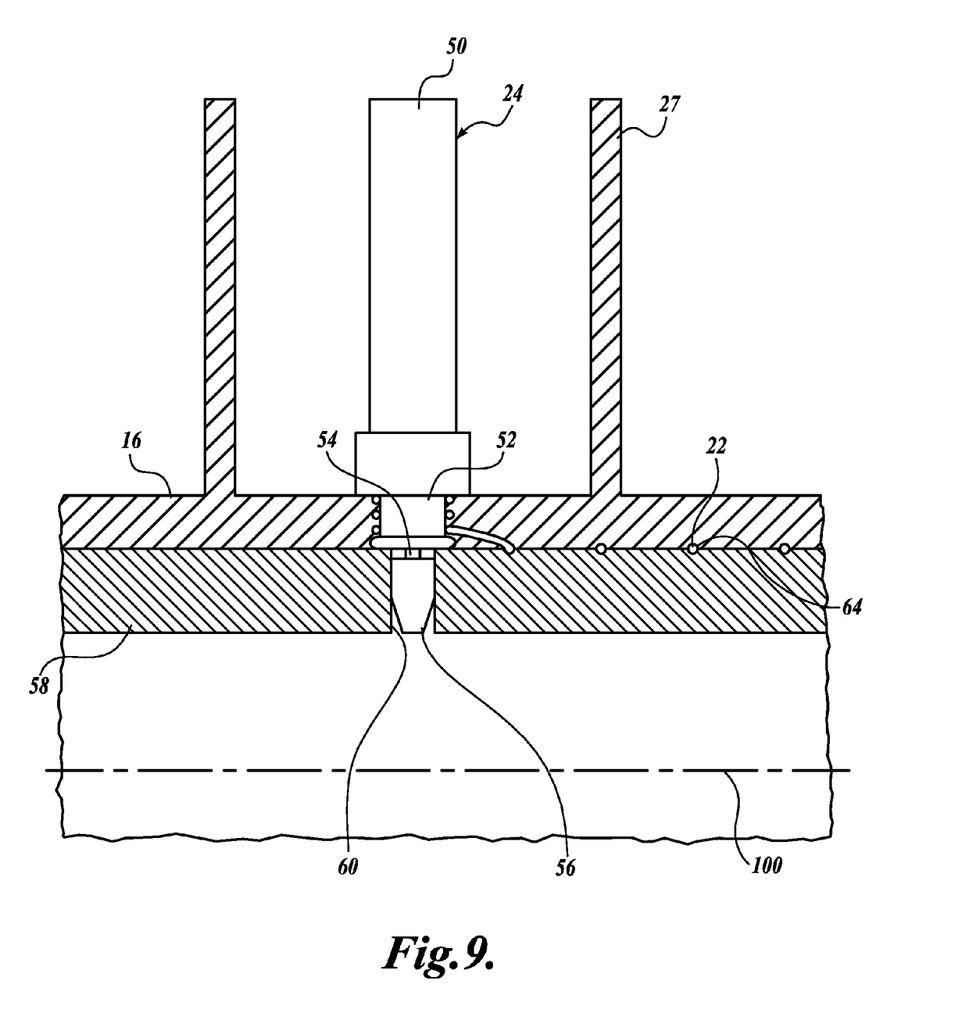
FIG. 9 is a sectional view of the electrical terminal stud disposed in the socket wall and the mould socket core.

Referring now to FIGS. 7, 8 and 9, there is shown one such moulding core 58 that is used to form the cavity and associated features of the socket 16 during manufacture. The moulding core 58 comprises a hollow tube that will fit into the main mould whereby the space in between will be equal to the desired thickness of the wall of socket 16. Said moulding core 58 comprises a transverse hole 60 into which the plug end 56 of the electrical stud 24 is driven prior to assembly of the mould (not shown). A slot 62 is formed at one end 63 of the core and in which the dovetail 42 of the dovetailed anvil 26 is disposed. A continuous helical groove 64 is formed around the circumference of the core 58 and in which the socket electrofusion element 22 is disposed. To complete assembly of the moulding core 58, an electrical resistance wire 22 is first wound around cubic section 52 of the stud 24, wound under tension around the groove 64, which retains the wire in position and prevents it from short-circuiting itself by making lateral contact with adjacent turns thereof, and then wound around post 40 of the anvil 26. The tension in the wire serves several purposes. The first is to keep the wire in the groove 64. The second is to bite the edges of the cubic section 52 and post 40 into the wire so that good electrical connection is made between them. The third is to ensure, together with the resilience of the wire, that the wire does not come off the stud or post. Finally, the tension retains the anvil 26 in the slot 62.

Once the socket core mould is assembled, the entire mould can be assembled, where another mould core (body mould core, not shown, but having a profile matching the bore 20 of the body 14) is arranged perpendicularly to axis 100 (end 63 is curved to abut the body core mould with no gap between them). Shell moulds surround the core moulds and molten plastics material is injected between. Once the plastics material has solidified, the mould is opened and the cores withdrawn along the axes 102, 100. In withdrawing the socket core 58, weak point 54 is sheared and fails, leaving plug 56 inside hole 60 (to be dislodged when a new plug is inserted) while the moulded socket retains the remainder of the stud terminal 24. The cylindrical section 50 then protrudes radially outwards from said socket 16. The winding of the wire 22 around the cubic section 52 is within the plastics of the wall of the socket and this further serves to retain the winding on the stud 24. The wire has to stretch to spring out of the groove 64.

The anvil 26 slides out of the slot 62, leaving the post 40 and arm 44 embedded in the plastics material, again, with the winding around the post retained by the plastics of the tapping tee. The dovetail section 42 protruding from the wall within the socket 16. In a similar manner, the socket electrofusion element 22 is then embedded along the inside of the socket 16 wall. FIG. 9 shows the stud terminal 24 embedded in the newly formed socket wall 16 prior to said mould core 58 being removed.

It should be noted that for the purpose of clarity, said weak point 54 has been exaggerated in FIG. 7, as has the thickness of the wire 22.

The grooves 64 of said moulding core 58 are shallow to reduce the friction between said moulding core 58, said socket electrofusion element 22 and the socket 16 wall when removing said moulding core 58 from said socket 16.

Figure 10:
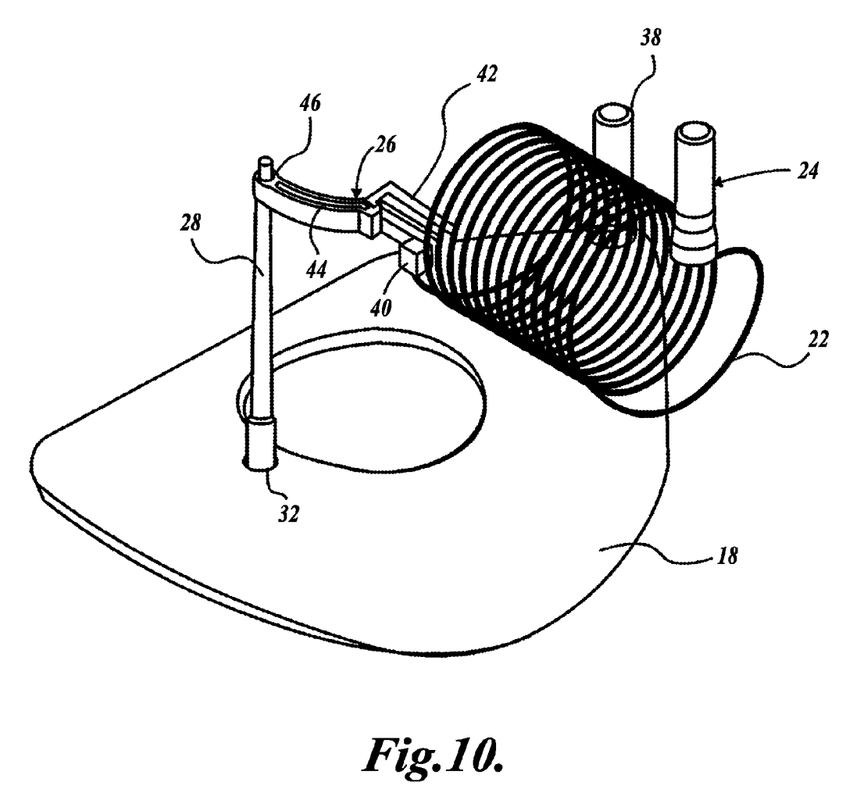
FIG. 10 is an illustration of the circuit means connecting the saddle electrofusion element to the socket electrofusion element.

The component of the main mould that produces the saddle 12 component of the tapping tee assembly 10 comprises a core-pin (not shown) that forms a tunnel bore 66 extending upwards from the saddle 12, through the wall of body 14 parallel the main bore 20. Said element also prevents said eye 46 of said dovetailed anvil 26 from filling with polymer material during moulding. With said saddle-shaped electrofusion mat 18 fixed in place to said saddle 12, the hole 32 through said saddle-shaped electrofusion mat 18 is in line with the saddle end of said tunnel 66. The electrical connecting pin 28 can then be disposed in the tunnel 66 forming an electrical bridge between said saddle electrofusion element 30 of said saddle-shaped electrofusion mat 18 and said eye 46 of said dovetailed anvil 26. The circuit is disclosed in further detail in FIG. 10.

Figure 11:
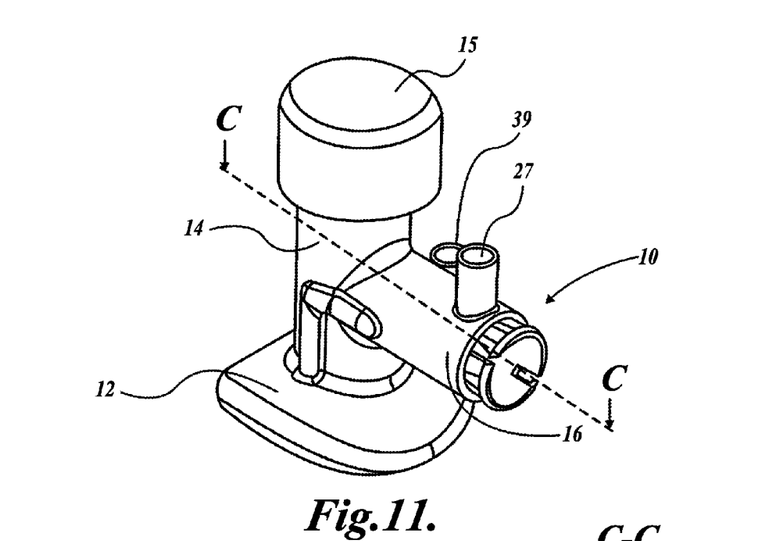
FIG. 11 is a perspective view of the tapping tee showing both terminals.
Figures 12, 13:
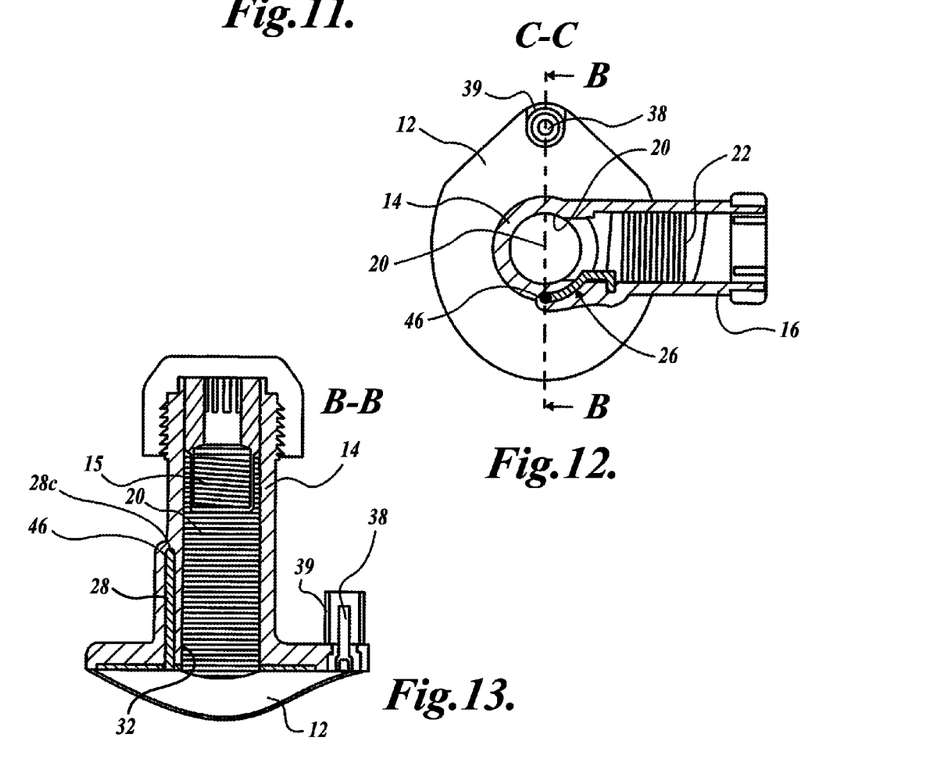
FIG. 12 is a sectional top view of the tapping tee assembly along the line C-C in FIG. 11.
FIG. 13 is a sectional side view of the tapping tee along the line B-B in FIG. 12.

FIG. 11 gives a perspective view of the tapping tee assembly 10 showing the arrangement of the upstanding terminal bosses 27,39 while FIG. 12 further illustrates the circuit means in particular the arrangement of said anvil 26 within said socket 16 and body 14 walls. The precise location of said anvil eye 46 is also disclosed in FIG. 12 and is incident with the head section 28c of said connecting pin (see FIG. 13).

Said saddle electrofusion element 30 and socket electrofusion element 22 are composed of a conducting material that produces sufficient heat to melt said fusible polymer material when an electrical current is passed through it, but does not itself, melt or break. Said dovetailed anvil 26, electrical stud 24 and electrical connecting pin 28 are composed of a good electrically conducting material that does not produce significant heat when an electric current is passed through it.

The circuit of the tapping tee assembly 10 comprises the upper and lower components of the electrofusion element 30 embedded in the saddle-shaped electrofusion mat 18 connected in parallel with one another, and in series with the socket electrofusion element 22 of the socket 16.

While the electrically conductive element that connects the saddle and socket electrofusion elements 30,22 is described above as two elements, the anvil 26 and pin 28, they could be a single component. In that event, pin-part 28 would have to include a stud end 29 (see FIG. 1) protruding from the bottom of the saddle 12 and on which the mat 18 could be located. This stud end 29 would therefore have to engage in a close fitting bore in the shell mould requiring accurate positioning of the socket core 58 with respect to the shell mould. This, together with the long distance between the connection of the dovetail 42 in the slot 62 and the stud end 29, would make this arrangement less preferable. Furthermore, the pin 28, when it is separate and is inserted afterwards and has the construction shown in FIG. 4, it can serve to retain the mat 18 in place, as well as contacting the wire 30 as it passes through the hole 32 in the mat 18. Although, this arrangement requires a core-pin to form the tunnel 66 and the core-pin has to engage precisely with the eye 46 of the arm 44, nevertheless the precision required is not so great since the cantilever of the element 26 is much less.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A moulded tapping tee assembly for a plastics pipeline comprising:
   a saddle, provided with a saddle-shaped saddle electrofusion element having a first terminal at an external end thereof;
   a hollow body, integral with the saddle and provided with an axial bore;
   a tubular socket, which:
      i) is integral with the hollow body;
      ii) has a socket bore in fluid connection with the axial bore of the body;
      iii) has an internal surface formed by a mould core that is withdrawn along a socket axis of the socket; and
      iv) has a tubular socket electrofusion element having a second terminal at a distal end thereof; and
   an electrically conductive element, which element connects an internal end of the saddle electrofusion element to a proximal end of the socket electrofusion element, wherein an internal part of said electrically conductive element is incorporated into the hollow body during moulding and an exposed part extends from said internal surface, in which said exposed part is shaped so as to fit inside a slot of said mould core, wherein said exposed part is held by said slot transverse to the socket axis but remains axially free so that it can be released from said slot subsequent to moulding.

2. A tapping tee assembly according to claim 1, wherein said exposed part of the electrically conductive element comprises a dovetail section which slots into a corresponding slot of said mould core.

3. A tapping tee assembly according to claim 1, wherein the first and second electrical terminals of the saddle and socket electrofusion elements are mounted on the saddle and socket respectively, and whereby a source of electrical power can be connected to both electrofusion elements simultaneously.

4. A tapping tee assembly according to claim 1, wherein the electrically conductive element comprises two components.

5. A tapping tee assembly according to claim 4, wherein one component is an anvil comprising said internal and exposed parts and the other component is a connecting pin inserted in a pin-bore of the tapping tee, after moulding thereof, to complete electrical connection between said anvil and said saddle electrofusion element.

6. A tapping tee assembly according to claim 5, wherein the anvil contains an eye to receive said pin.

7. A tapping tee assembly according to claim 6, wherein the eye of the anvil is conical in shape to guide insertion of said pin.

8. A tapping tee assembly according to claim 5, wherein the connecting pin comprises a base, body and head section.

9. A tapping tee assembly according to claim 8, wherein the head of the connecting pin is ridged with one or more ridges, said one or more ridges being deformed on engagement of the head in the eye so as to ensure secure electrical bridging between the pin and anvil and retention of the pin therein.

10. A tapping tee assembly according to claim 8, wherein the head of the connector has a smaller diameter than the body of the connector pin.

11. A tapping tee assembly according to claim 8, wherein the base of the connecting pin has a greater diameter than the body of the connecting pin.

12. A tapping tee assembly according to claim 1, wherein the saddle electrofusion element is a spirally wound electrofusion resistance wire.

13. A tapping tee assembly according to claim 1, wherein the saddle electrofusion element is integrated with the saddle by over-moulding the saddle, or embedded within the pre-moulded body of the saddle by ploughing-in an electrical resistance wire.

14. A tapping tee assembly according to claim 1, wherein a separate electrofusion mat forming the saddle electrofusion element is mounted in the saddle or clipped into a recess moulded in the saddle.

15. A tapping tee assembly according to claim 14, wherein the electrofusion mat comprises a disc of fusible polymeric material having an electrofusion element embedded therein.

16. A tapping tee assembly according to claim 14, wherein the electrofusion element has parts on both sides of said disc, whereby the mat is fused to both the saddle and the pipeline during electrofusion.

17. A tapping tee assembly according to claim 12, wherein said resistance wire commences at said first terminal, spirals to said internal end on one side of said disc where it passes through an aperture in said disc to the other side thereof, and spirals outwardly back to said first terminal, said electrically conductive element contacting said wire at said aperture.

18. A tapping tee assembly according to claim 17, wherein the electrically conductive element comprises two components, wherein one component is an anvil comprising said internal and exposed parts and the other component is a connecting pin inserted in a pin-bore of the tapping tee, after moulding thereof, to complete electrical connection between said anvil and said saddle electrofusion element, and wherein said pin passes through said aperture contacting the resistance wire therein.

19. A tapping tee assembly according to claim 18, wherein the connecting pin comprises a base, body, and head section, and wherein said base has a flange that clamps the internal end of the mat to the saddle, said external end being fixed by said first terminal.

20. A tapping tee assembly according to claim 1, wherein the body of the tapping tee assembly is moulded integrally with the saddle.

21. A tapping tee assembly according to claim 1, wherein the electrically conductive element has low resistance when an appropriate electrofusion current is passed through it.

22. A tapping tee assembly according to claim 1, wherein the saddle and socket electrofusion elements are balanced such that when the circuit is energised the heat output per unit area per unit time from each of the first and second electrofusion elements is correct in each case.

23. A tapping tee assembly according to claim 22, wherein the saddle and socket electrofusion elements are electrically balanced such that when the circuit is energised the time taken to complete the fusion bond for each of the first and second fusion elements is substantially identical.

24. A tapping tee assembly according to claim 1, wherein the body of the tapping tee assembly is provided with a threaded bore cooperating with external threads on a cutter such that when the cutter is rotated it can travel along the bore to cut a hole in the pipeline when the tapping tee has been connected thereto.

25. A tapping tee assembly according to claim 1, in which the socket electrofusion element is a helically wound electrical resistance wire.

26. A tapping tee assembly according to claim 25, wherein said electrically conductive element has a square section post on which said wire is wound.

27. A method of constructing a tapping tee assembly as claimed in claim 1, comprising:
  i) locating said exposed part of said electrically conductive element in said slot of the mould core;
  ii) connecting resistance wire to said electrically conductive element and winding same around the mould core;
  iii) temporarily attaching via a shearable coupling said second terminal to the mould core and connecting said resistance wire thereto;
  iv) closing a mould around said mould core;
  v) injecting molten plastics material into the mould and cooling;
  vi) separating the mould and withdrawing said mould core in the direction of said socket axis:
    to leave said exposed part of the electrically conductive element in the tapping tee exposed on the internal surface of the socket;
    to shear said coupling to leave said second terminal mounted in said socket; and
    to leave said resistance wire embedded in said internal surface of the socket; and
  vii) connecting said saddle electrofusion element to said electrically conductive element.

28. A method as claimed in claim 27, wherein the electrically conductive element comprises two components;
  wherein one component is an anvil comprising said internal and exposed parts and the other component is a connecting pin inserted in a pin-bore of the tapping tee, after moulding thereof, to complete electrical connection between said anvil and said saddle electrofusion element, wherein the anvil contains an eye to receive said pin, and wherein step vii) comprises inserting said pin in a pin-bore moulded in said body that is coincident with said eye of the anvil.

29. A method as claimed in claim 28, wherein a separate electrofusion mat forming the saddle electrofusion element is mounted in the saddle or clipped into a recess moulded in the saddle, wherein step vii) connects the saddle electrofusion element to the saddle.

30. A method as claimed in claim 27, in which step ii) comprises winding said wire around a square-section post of said electrically conductive element.

31. A method as claimed in claim 27, in which step iii) includes winding said wire around a square-section length of said second terminal.

32. A method as claimed in claim 27, in which said wire is tensioned between its connections to the electrically conductive element and second terminal.

33. A method of making a moulded tapping tee assembly for a plastics pipeline comprising the steps of:

providing a mould comprising shell moulds to form external surfaces of a saddle, body and socket of the tapping tee, a body mould core to form an axial bore in a body of the tapping tee and a socket mould core to form a socket bore, said socket mould core being shaped to abut said body mould core in a socket axis direction whereby said socket bore of the tapping tee when formed communicates with said axial body bore thereof;

fitting an exposed part of an electrically conductive element in a slot in the end of the socket mould core, which slot and element are shaped to secure said element in a direction transverse to said socket axis but permit withdrawal of said socket mould core from said element by relative movement between them in a direction parallel said socket axis;

fitting a terminal in a transverse bore of the socket mould core;

connecting an electrical resistance wire to one of said terminal and electrically conductive element and winding said wire around the socket mould core and connecting to the other of said terminal and electrically conductive element;

closing the mould, injecting molten plastics material into the mould and allowing the material to cool before opening the mould and withdrawing said cores from the moulded tapping tee; and connecting a saddle electrofusion element to said electrically conductive element.

34. A method as claimed in claim 33, in which said step of connecting a saddle electrofusion fitting comprises mating an electrically conductive pin with an eye of said electrically conductive element, which eye is shielded by a pin-core of said mould during injection of said plastics material, said pin-core being of such diameter that said pin is a close sliding fit in the bore formed by said pin-core in the tapping tee.

35. A method as claimed in claim 34, in which said pin-core is arranged parallel said body mould core.

36. A method as claimed in claim 34 in which said saddle electrofusion element is formed separately and is fitted to said tapping tee and secured thereto at least partially by said pin.

37. A method as claimed in claim 33 in which said step of connecting an electrical resistance wire comprises winding the wire around a polygonal section part of said terminal and electrically conductive element.

38. A method as claimed in claim 37, in which the wire is tensioned between said terminal and electrically conductive element, whereby said tension both retains the wire in connection with said terminal and electrically conductive element and retains the electrically conductive element in position in said slot.

* * * * *